US010161630B2

(12) United States Patent
Persson

(10) Patent No.: US 10,161,630 B2
(45) Date of Patent: Dec. 25, 2018

(54) SYSTEMS AND METHODS FOR TESTING FLUE GAS CLEANING SYSTEMS

(71) Applicant: General Electric Technology GmbH, Baden (CH)

(72) Inventor: Daniel PerNiklas Persson, Sweden (SE)

(73) Assignee: General Electric Technology GmbH, Baden (CH)

( * ) Notice: Subject to any disclaimer, the term of this patent is extended or adjusted under 35 U.S.C. 154(b) by 21 days.

(21) Appl. No.: 15/366,239

(22) Filed: Dec. 1, 2016

(65) Prior Publication Data

US 2018/0156454 A1   Jun. 7, 2018

(51) Int. Cl.
| | |
|---|---|
| F23J 7/00 | (2006.01) |
| F23J 3/02 | (2006.01) |
| F27D 21/04 | (2006.01) |
| B01D 53/80 | (2006.01) |
| B01D 53/30 | (2006.01) |
| B01D 53/34 | (2006.01) |

(52) U.S. Cl.
CPC ............. *F23J 3/023* (2013.01); *B01D 53/80* (2013.01); *F23J 7/00* (2013.01); *F27D 21/04* (2013.01); *B01D 53/30* (2013.01); *B01D 53/346* (2013.01); *B01D 2251/404* (2013.01); *B01D 2251/602* (2013.01); *B01D 2251/604* (2013.01); *B01D 2257/302* (2013.01); *B01D 2258/0283* (2013.01)

(58) Field of Classification Search
CPC ....................................... F23J 3/023
USPC ............................................. 431/3
See application file for complete search history.

(56) References Cited

U.S. PATENT DOCUMENTS

| | | | |
|---|---|---|---|
| 4,336,035 A | | 6/1982 | Evenstad et al. |
| 4,366,123 A | * | 12/1982 | Kato .................. B01F 7/00158 366/279 |
| 4,650,555 A | * | 3/1987 | Rzad ...................... B01D 53/32 204/174 |
| 4,755,366 A | | 7/1988 | Schwartzbach |
| 4,795,566 A | | 1/1989 | Carlsson |
| (Continued) | | | |

FOREIGN PATENT DOCUMENTS

| | | |
|---|---|---|
| CN | 201195100 Y | 2/2009 |
| DE | 3727794 A1 | 10/1986 |
| (Continued) | | |

OTHER PUBLICATIONS

Wen-Ching Yang: "Handbook of Fluidization and Fluid-Particle Systems", pp. 450-451, Marcel Dekker AG NY, 2003.

*Primary Examiner* — Avinash Savani
(74) *Attorney, Agent, or Firm* — GE Global Patent Operation; Rita D. Vacca

(57) ABSTRACT

A sampling assembly includes a vessel that is configured to receive a flue gas stream at a predetermined temperature and a regent product. The sampling assembly also includes an agitator positioned within the vessel. The agitator is configured to rotate within the vessel to cause a chemical reaction to induce formation of particulate matter. The sampling assembly further includes a sensor coupled to the agitator. The sensor is configured to measure a variable operating parameter of the agitator, wherein a change in value of the variable operating parameter is indicative that the particulate matter agglomerates at the predetermined flue gas stream temperature.

20 Claims, 3 Drawing Sheets

(56) References Cited

U.S. PATENT DOCUMENTS

| | | | |
|---|---|---|---|
| 4,895,733 A * | 1/1990 | Imanidis | B01J 2/14 |
| | | | 118/303 |
| 5,320,052 A | 6/1994 | Spokoyay et al. | |
| 5,326,536 A * | 7/1994 | Carter | B01D 53/56 |
| | | | 110/190 |
| 5,861,053 A | 1/1999 | Noritake et al. | |
| 2005/0284212 A1 | 12/2005 | Marchal et al. | |
| 2006/0121616 A1 | 6/2006 | Lefebvre et al. | |
| 2008/0210085 A1 | 9/2008 | Morf | |
| 2010/0104487 A1 | 4/2010 | Smid et al. | |

FOREIGN PATENT DOCUMENTS

| | | |
|---|---|---|
| EP | 0173403 A2 | 3/1986 |
| EP | 0282514 B1 | 9/1988 |
| EP | 0723804 A1 | 7/1996 |
| EP | 1537905 A1 | 6/2005 |
| EP | 1815903 A1 | 8/2007 |
| EP | 1964602 A1 | 9/2008 |
| EP | 2078555 A1 | 7/2009 |
| EP | 2638952 A1 | 9/2013 |
| JP | 2000288332 A2 | 10/2000 |
| WO | 95/33547 A1 | 12/1995 |
| WO | 9737747 A1 | 10/1997 |

\* cited by examiner

SYSTEMS AND METHODS FOR TESTING FLUE GAS CLEANING SYSTEMS

BACKGROUND

The present disclosure relates generally to power plants and, more specifically, to systems and methods for testing flue gas cleaning systems.

At least some known power plants generate energy derived from the combustion of carbon and hydrogen-containing fuels such as coal, oil, peat, waste, biofuel, natural gas, and the like. In addition to carbon and hydrogen, these fuels may contain oxygen, moisture, and contaminants. As such, the combustion of such fuels results in the production of a gas stream containing the contaminants in the form of ash, carbon dioxide ($CO_2$), sulfur compounds (often in the forms of sulfur oxides, referred to as "SOx"), nitrogen compounds (often in the form of nitrogen oxides, referred to as "NOx"), chlorine compounds (often referred to as "HCl"), mercury, and other trace elements.

Known power plants may use capture systems to facilitate removing the contaminants from the gas stream, prior to releasing into the atmosphere. For example, some known flue gas desulfurization (FGD) systems include multiple components that facilitate removing or scrubbing sulfur compounds and other acid gases from the gas stream of power plants. Some of such known FGD systems, for example, use a calcium-based reagent, such as calcium hydroxide (lime) to react with the sulfur compounds and other acid gases within the gas stream to form solid particles, such as calcium sulfite, which then may be extracted from the gas stream. Moreover, at least some of these known systems are semi-dry systems that at least partially recirculate the reagent. For example, some known semi-dry FGD systems recycle the solid particles by mixing the particles with fresh reagent and hydrating the mixture before injecting it into the gas stream. Once in the gas stream, water within the mixture evaporates and the resulting solid particulates are flash dried to be recirculated within the system.

Such semi-dry systems generally increase in efficiency as a temperature of the gas stream is lowered, however, there is a lower temperature limit, such as a condensation temperature, which agglomeration of the hydrated solid particulates results in caking or pelletization, which may stress the components of the recirculation system. In at least some applications, the lower temperature limit is dependent upon a large number of environmental factors and operating conditions, and is difficult to indirectly predict or derive from external measurements because there are many different parameters that affect agglomeration of the particulate matter within the flue gas desulfurization systems. Thus, at least some of such systems either operate at an increased temperature to ensure the lower limit is not reached when conditions change, thus decreasing efficiency, or alternatively operate at a temperature that may undesirably slip below the lower temperature limit in response to changing conditions, which may result in increased agglomeration and stress on the recirculation system.

BRIEF DESCRIPTION

In one aspect, a sampling assembly is provided. The sampling assembly includes a vessel that is configured to receive a flue gas stream at a predetermined temperature and a reagent product. The sampling assembly also includes an agitator positioned within the vessel. The agitator is configured to rotate within the vessel to cause a chemical reaction to induce formation of particulate matter. The sampling assembly further includes a sensor coupled to the agitator. The sensor is configured to measure a variable operating parameter of the agitator, wherein a change in value of the variable operating parameter is indicative that the particulate matter agglomerates at the predetermined flue gas stream temperature.

In another aspect, a power plant system is provided. The power plant system includes a power plant configured to generate a flue gas stream. The power plant includes a flue gas cleaning system and a sampling assembly coupled to the flue gas cleaning system. The sampling assembly includes a vessel that is configured to receive a flue gas stream at a predetermined temperature and a reagent product. The sampling assembly also includes an agitator positioned within the vessel. The agitator is configured to rotate within the vessel to cause a chemical reaction to induce formation of particulate matter. The sampling assembly further includes a sensor coupled to the agitator. The sensor is configured to measure a variable operating parameter of the agitator, wherein a change in value of the variable operating parameter is indicative that the particulate matter agglomerates at the predetermined flue gas stream temperature.

In a further aspect, a method of determining an agglomeration limit of particulate matter in a flue gas cleaning system is provided. The method includes channeling a flue gas stream at a predetermined temperature to a vessel and channeling a reagent product to the vessel to cause a chemical reaction to induce formation of particulate matter. The method also includes measuring a variable operating parameter of an agitator rotating within the vessel, wherein a change in value of the variable operating parameter is indicative that the particulate matter agglomerates at the predetermined flue gas stream.

DETAILED DESCRIPTION OF THE INVENTION

Figure 1:
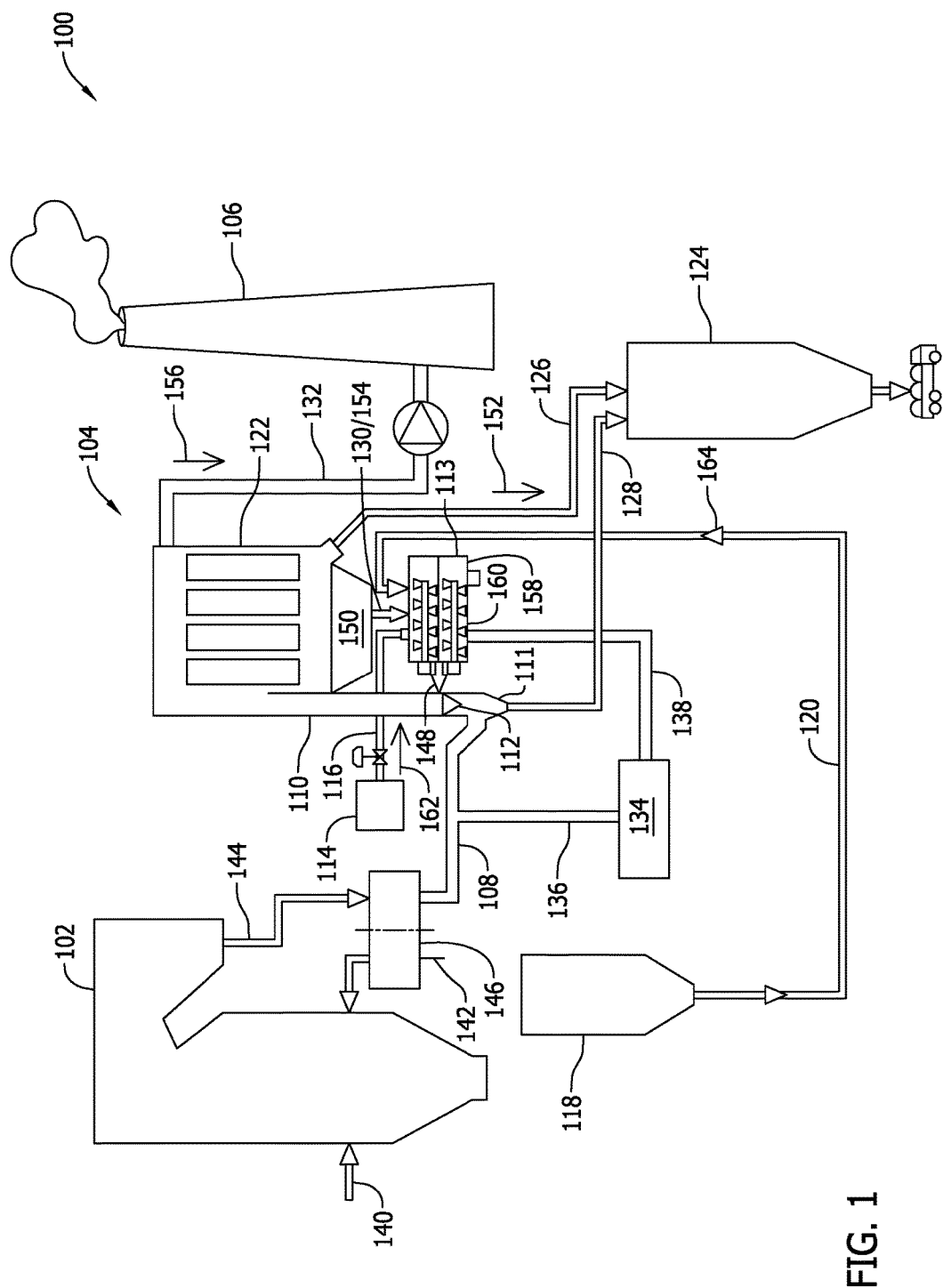
FIG. 1 is a schematic diagram of an exemplary power plant.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations may be identified. Such ranges may be combined and/or interchanged, and include all the subranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Embodiments of the present disclosure relate to systems and methods for agglomeration testing of flue gas cleaning systems. In the exemplary embodiments, the flue gas cleaning system facilitates removing or scrubbing sulfur compounds and other acidic gases from a flue gas stream of power plants. For example, in the exemplary embodiments, a calcium-based hydrated reagent product is introduced into the flue gas stream to chemically react with the sulfur compounds and other acidic gases within the flue gas stream to form dry solid particulate matter that may be extracted from the flue gas stream. To prevent agglomeration, such as cake-formation, pelletization, and build-up, of the particulate matter within the system, the temperature of the flue gas stream is maintained at a higher temperature than its condensation temperature to evaporate the moisture within the reagent product. However, the chemical reaction used to form the particulate matter and extract sulfur compounds and other acidic gases from the flue gas occurs more efficiently at lower temperatures, as long as the temperature is above a condensation point of the flue gas stream.

In the exemplary embodiments, a sampling assembly is included to test an agglomeration limit of the flue gas cleaning system, thus enabling the flue gas cleaning systems to operate closer to the condensation point of the flue gas stream. As such, the efficiency of the system is facilitated to be increased, while reducing the risk of operating below the lower temperature limit. The sampling assembly includes a vessel that receives the flue gas stream, at a predetermined temperature and the reagent product such that a chemical reaction forms particulate matter. An agitator is positioned within the vessel to rotate within the vessel. A variable operating parameter, such as torque, is measured to determine if agglomeration of the particulate matter occurs within the sampling assembly at the predetermined temperature. Sampling may be continuous or may be batch-wise. As such, the sampling assembly enables an agglomeration limit, based on the flue gas temperature in the system, to be accurately determined for use in operation of the flue gas cleaning system.

FIG. 1 is a schematic diagram of an exemplary power plant 100. In the exemplary embodiment, power plant 100 includes, in a serial flow relationship, a boiler 102, an air quality control system (AQCS) 104, and a stack 106. AQCS 104 is a flue gas desulfurization or cleaning system that includes an inlet duct 108 such that AQCS 104 is coupled in flow communication with boiler 102. Inlet duct 108 includes a vertical portion 110, and a reactor 112 coupled to vertical portion 110, for example, adjacent to a bottom end 111 of vertical portion 110. Reactor 112 is coupled to a distribution device 113 that is coupled in flow communication with a water supply 114 via a water line 116. Additionally, distribution device 113 is coupled in flow communication with a reagent supply 118 via a reagent line 120.

Downstream from reactor 112, inlet duct 108 is coupled in flow communication to a fabric filter 122. Fabric filter 122 and inlet duct 108 are each coupled in flow communication with a hopper 124 via respective lines 126 and 128. Additionally, fabric filter 122 is coupled in flow communication with reactor 112 via a line 130. AQCS 104 also includes an outlet duct 132 that couples AQCS 104 in flow communication with stack 106, and a sampling assembly 134 that is coupled in flow communication with inlet duct 108 and reactor 112 via respective lines 136 and 138. Sampling assembly 134 will be discussed in more detail below in reference to FIG. 2. Furthermore, in alternative embodiments, other systems using additional equipment and components may be coupled between boiler 102 and AQCS 104, and/or between AQCS 104 and stack 106 that enable power plant 100 to function as described herein.

During operation of power plant 100, fuel 140, such as coal, natural gas, or other fossil fuel, is supplied to boiler 102 in addition to a supply of air 142. Boiler 102 combusts fuel 140 and produces a flue gas stream 144 that may include sulfur compounds (often in the forms of sulfur oxides, referred to as SOx), and other acidic gases such as hydrogen chloride (HCl), hydrofluoric acid (HF), fly ash particulates, and other acidic pollutants and/or particulates. From boiler 102, flue gas stream 144 is channeled through an air preheater 146, to enable a portion of heat to be transferred from flue gas stream 144 to air 142 supplied to boiler 102, and then into inlet duct 108.

As flue gas stream 144 is channeled through inlet duct 108, at vertical portion 110, distribution device 113 introduces a reagent product 148, such as a calcium-based reagent, to flue gas stream 144 to facilitate scrubbing the sulfur compounds and other acid gases entrained within flue gas stream 144. For example, reagent product 148 mixes with flue gas stream 144 and chemically reacts with the sulfur compounds and other acid gases to form a dry reacted agent that is channeled to fabric filter 122 along with flue gas stream 144. At fabric filter 122, particulate matter 150, including the dry reacted agent and any other particulate matter, such as fly ash, is collected. A portion 152 of particulate matter 150 is channeled to hopper 124 via line 126 such that particulate matter 152 may be transported elsewhere for other purposes. Another portion 154 of particulate matter 150 is channeled to distribution device 113 to be recycled back into reagent product 148. Scrubbed flue gas stream 156 is then exhausted from AQCS 104 via outlet duct 132 and to stack 106 for discharge into the atmosphere.

In the exemplary embodiment, distribution device 113 includes a container 158 that includes a mixer 160. Container 158 receives a water stream 162 that is channeled from water supply 114 via water line 116, and reagent 164 channeled from reagent supply 118 via reagent line 120. In the exemplary embodiment, reagent 164 is a calcium-based reagent that uses, for example, calcium hydroxide (lime) and/or calcium oxide, to react with the sulfur compounds and other acid gases within flue gas stream 144 to form solid particles. The solid particles formed are calcium sulfite, which is the dry reacted agent. Additionally, container 158 receives the portion of particulate matter 154 collected from fabric filter 122 to be recycled therein, since not all of reagent 164 chemically reacts with the sulfur compounds and other acid gases within flue gas stream 144. Mixer 160 mixes water 162, reagent 164, and particulate matter 154 to form reagent product 148 that is introduced into reactor 112. In the exemplary embodiment, reagent product 148 has a water content of between approximately 1 percent and approximately 6 percent by weight, such that during reaction with flue gas stream 144, the water evaporates therefrom and the dry reacted agent is flash dried.

In the exemplary embodiment, power plant 100 is a coal combusting power plant. However, in alternative embodiments, power plant 100 may be any other type of plant, for example, power plant 100 may combust biomass and/or waste. In another example, power plant 100 may be for industrial applications, such as iron and steel that may include combined heat and power plants (CHP).

Figure 2:
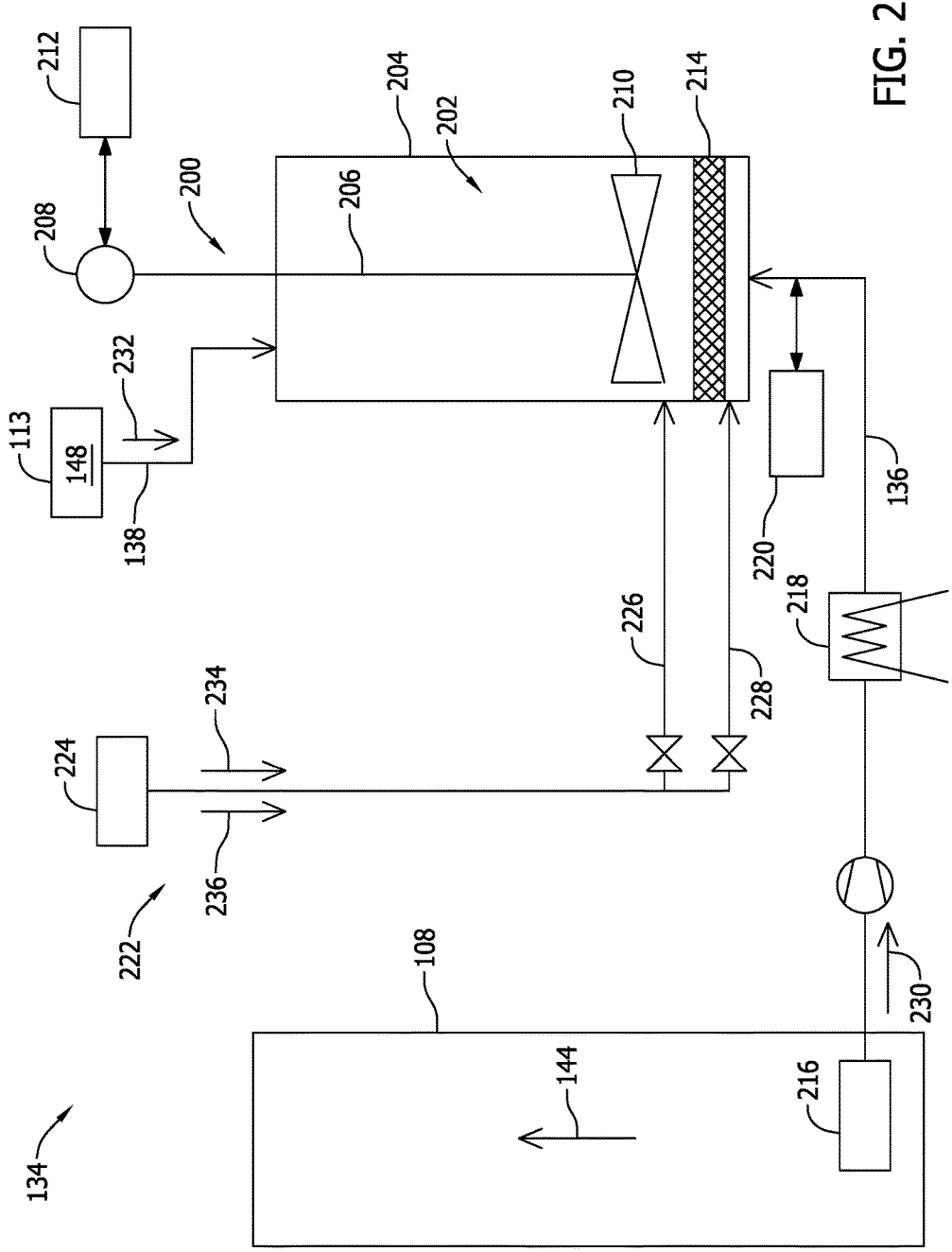
FIG. 2 is a schematic diagram of an exemplary sampling assembly that may be used with the power plant shown in FIG. 1.

FIG. 2 is a schematic diagram of an exemplary sampling assembly 134 that may be used with power plant 100 (shown in FIG. 1). In the exemplary embodiment, sampling assembly 134 includes an agitator 200 positioned within an interior cavity 202 of a vessel 204. Agitator 200 includes a shaft 206 that extends from external to vessel 204 into interior cavity 202. Shaft 206 is coupled to a motor 208 external to vessel 204 and on an opposite end, includes a plurality of blades 210 that extend outward within interior cavity 202. Vessel 204 includes a fluidizing member 214 that is adjacent to blades 210. In alternative embodiments, agitator 200 includes any suitable structure that enables sampling assembly 134 to function as described herein. An operating parameter sensor 212 is communicatively coupled to agitator 200. For example, in the exemplary embodiment, sensor 212 is communicatively coupled to motor 208 of agitator 200.

Sampling assembly 134 is coupled in flow communication with AQCS inlet duct 108 via flue gas line 136. A sampling filter 216 is positioned within inlet duct 108 and is coupled to a first end of flue gas line 136. An opposite second end of flue gas line 136 is coupled to vessel 204. In the exemplary embodiment, sampling filter 216 is upstream from reactor 112 (shown in FIG. 1). A heat exchanger 218 is coupled to flue gas line 136, and downstream from heat exchanger 218, a temperature sensor 220 is coupled to flue gas line 136. Additionally, sampling assembly 134 is also coupled in flow communication with distribution device 113 via reagent product line 138. More specifically, line 138 enables a portion 232 of reagent product 148 mixed within distribution device 113 to be channeled to vessel 204. Furthermore, in the exemplary embodiment, sampling assembly 134 also includes a cleaning assembly 222. Cleaning assembly 222 includes a supply source 224 that is coupled in flow communication with vessel 204 via cleaning lines 226 and 228.

In operation, sampling assembly 134 mixes reagent product 148 with flue gas stream 144 within vessel 204 and measures a variable operating parameter of agitator 200 to determine an agglomeration limit based on the temperature of flue gas stream 144 in AQCS 104 (shown in FIG. 1). Specifically, sampling filter 216 extracts a portion 230 of flue gas stream 144 through gas flue line 136 to vessel 204. In some embodiments, flue gas stream 230 is passively cooled via heat losses from flue gas line 136. In other embodiments, flue gas stream 230 is actively cooled via heat exchanger 218. In each embodiment, flue gas stream 230 is cooled to a predetermined temperature that is above condensation temperature, prior to testing within vessel 204. The temperature of flue gas stream 230 is measured by temperature sensor 220 before stream 230 is channeled into interior cavity 202. At vessel 204, flue gas stream 230 passes through fluidizing member 214, such as a fluidizing cloth or sintered metal plate, to cause flue gas stream 230 to be dispersed throughout cavity 202.

At vessel 204, flue gas stream 230 and a portion 232 of reagent product 148 are mixed together to enable the calcium-based reagent to react with the sulfur compounds and other acid gases and form solid particulate matter 150 (shown in FIG. 1), similar to the operation of AQCS 104, as described above. In the exemplary embodiment, as discussed above, reducing the temperature of flue gas stream 230 increases the efficiency of the chemical reaction and thus increases the sulfur compounds and other acid gases removed from flue gas stream 230. However, reducing the temperature of flue gas stream 230 also increases agglomeration, such as cake formation and/or build-up, of particulate matter 150 on components of the system because the water content of reagent product 232 cannot be evaporated and flash dried into the dry reacted agent. As such, as motor 208 rotates agitator 200 within vessel 204, sensor 212 measures a variable operating parameter of agitator 200 to determine when agglomeration of particulate matter 150 occurs on agitator 200. For example, sensor 212, in one embodiment, measures a torque of agitator 200 and/or a current of motor 208. Based on a change in the torque and/or a current value measured by sensor 212, relative to a baseline or clean value, a determination can be made that agglomeration has occurred within vessel 204. Alternatively, any other variable operating parameter may be measured that enables sampling assembly 134 to function as described herein.

By determining if agglomeration of particulate matter 150 has occurred on agitator 200, the temperature of flue gas stream 230 at which agglomeration occurs is determined. As such, sampling assembly 134 may be used to determine an agglomeration temperature limit for AQCS 104 based on the temperature of flue gas stream 230 for AQCS 104. In some embodiments, sampling assembly 134 may provide batch-wise sampling. For example, in some embodiments, a batch of reagent product 232 is mixed with a batch of flue gas 230 at a predetermined temperature to determine if agglomeration of particulate matter 150 occurs. After sampling the batch, vessel 204 may be cleaned to prepare vessel 204 for further sampling at different temperatures. In other embodiments, sampling assembly 134 may utilize continuous sampling. For example, reagent product 232, in some embodiments, may be continuously mixed with flue gas 230, and agglomeration of particulate matter 150 is measured for different predetermined temperatures. If agglomeration is determined, vessel 204 may be cleaned during the continuous process.

In the exemplary embodiment, vessel 204 is cleaned using cleaning assembly 222. In some embodiments, supply source 224 is an air supply source that channels pressurized air 234 through cleaning lines 226 and 228 to remove any agglomeration of particulate matter 150 from within interior cavity 202. In other embodiments, supply source 224 is a wet supply source that channels a mixture of water and chemicals 236 through cleaning lines 226 and 228 to remove any agglomeration of particulate matter 150 from within interior cavity 202. In both embodiments, vessel 204 may include a drain (not shown) to remove any excess cleaning product and/or particulate matter 150.

In alternative embodiments, moisture content of flue gas stream 230 may be increased before being channeled into vessel 204 to determine an agglomeration limit of particulate matter 150. Additionally, sampling assembly 136 may be incorporated in new flue gas cleaning systems. Alternatively, sampling assembly 136 may be retrofitted into existing flue gas cleaning systems.

Figure 3:
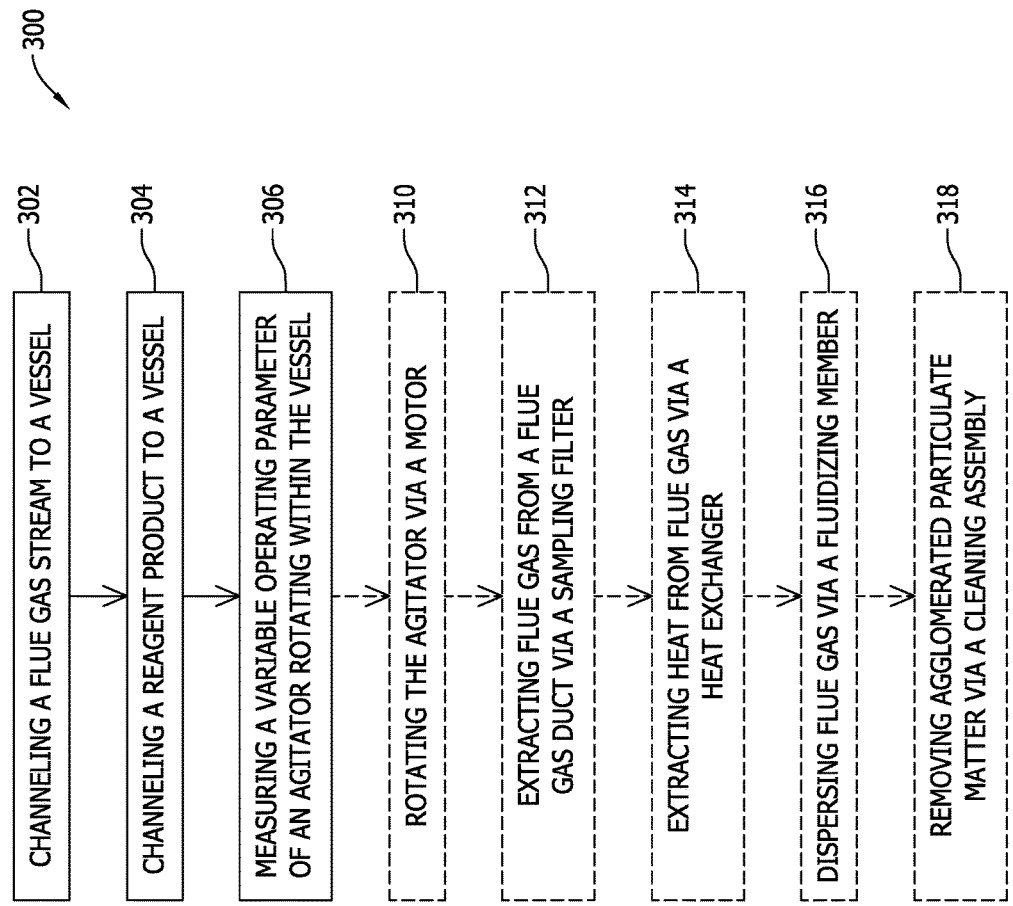
FIG. 3 is a flow diagram of an exemplary method of determining an agglomeration limit of particulate matter in a power plant, such as the power plant shown in FIGS. 1-2.

FIG. 3 is a flow diagram of an exemplary method 300 that may be implemented to determine an agglomeration limit of particulate matter in a power plant, such as the power plant 100 (shown in FIG. 1). With reference also to FIGS. 1-2, in the exemplary method 300, a flue gas stream, such as flue gas stream 230, at a predetermined temperature is channeled 302 to a sampling vessel, such as vessel 204. Additionally, a reagent product, such as reagent product 148, is channeled 304 to the sampling vessel to cause a chemical reaction to induce formation of particulate matter, such as particulate matter 150. A variable operating parameter of an agitator, such as agitator 200, is measured 308 via a sensor, such as sensor 212, that is coupled to the agitator. The agitator rotates within the vessel, wherein a change in the value of the variable operating parameter is indicative that the particulate matter agglomerates at the predetermined flue gas stream temperature.

In some embodiments, the agitator is rotated 310 via a motor, such as motor 208, and the sensor is coupled to the motor. Additionally or alternatively, method 300 includes the flue gas stream being extracted 312 from a flue gas duct, such as inlet duct 108, via a sampling filter, such as sampling filter 216. Heat may then be extracted 314 from the flue gas stream via a heat exchanger, such as heat exchanger 218.

In certain embodiments, the flue gas stream is dispersed 316 within the sampling vessel via a fluidizing member, such as fluidizing member 214. In some embodiments, the agglomerated particulate matter is removed 318 from the sampling vessel and the agitator via a cleaning assembly, such as cleaning assembly 222.

The above-described systems and methods provide an efficient method for determining an agglomeration limit of flue gas cleaning systems. Specifically, a sampling assembly is used to test the agglomeration limit of the flue gas cleaning system, thus enabling the flue gas cleaning systems to operate at a temperature that is close to the condensation point of the flue gas stream. As a result, the efficiency of the system is facilitated to be increased, without increasing the risk of the system operating below the condensation point. The sampling assembly includes a vessel that receives the flue gas stream, and based on the flue gas temperature and the resulting chemical reaction within the vessel, can be used to determine if agglomeration of the particulate matter occurs at the predetermined temperature. As such, the sampling assembly enables an agglomeration limit, based on the current flue gas temperature, of the system to be determined. By directly measuring the agglomeration limit, the sampling assembly is more accurate than known systems that rely on indirect estimates for the agglomeration limit such as raw gas calculations and particle density measurements.

Furthermore, with the exemplary configurations, the retrofitting may occur during a typical outage such that the power plant does not experience any additional outage time. Through use of the sampling assembly, temperature of the flue gas may be reduced to increase the efficiency of the flue gas cleaning system without risking agglomeration therein. As such, a lesser amount of calcium-based reagents are consumed. Also, control of the scrubbing process is facilitated to be increased, thereby reducing system downtime and the associated costs, such as maintenance, due to agglomeration. Furthermore, dual-fuel boiler systems may have a quicker fuel change time, with the sampling assembly generating a more accurate and quicker flue gas temperature limit determination.

The systems and methods described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A sampling assembly comprising:
   a vessel configured to receive a flue gas stream at a predetermined temperature and a reagent product;
   an agitator positioned within said vessel, said agitator configured to rotate within said vessel to cause a chemical reaction to induce formation of particulate matter;
   a sensor coupled to said agitator, said sensor configured to measure a variable operating parameter of said agitator, wherein a change in value of the variable operating parameter is indicative that the particulate matter agglomerates at the predetermined flue gas stream temperature; and
   a cleaning assembly.

2. The sampling assembly in accordance with claim 1, wherein said sensor measures a torque of said agitator.

3. The sampling assembly in accordance with claim 1 further comprising a motor configured to rotate said agitator, wherein said sensor is coupled to said motor and said sensor measures a current of said motor.

4. The sampling assembly in accordance with claim 1 further comprising a sampling filter positioned within a flue gas duct, said sampling filter configured to extract flue gas stream from said flue gas duct.

5. The sampling assembly in accordance with claim 1 further comprising a heat exchanger configured to extract heat from the flue gas stream entering said sampling assembly such that the flue gas stream is cooled to the predetermined temperature.

6. The sampling assembly in accordance with claim 1 further comprising a fluidizing member configured to disperse the flue gas stream within said vessel.

7. The sampling assembly in accordance with claim 1, wherein said cleaning assembly is configured to remove agglomerated particulate matter from said vessel and said agitator.

8. The sampling assembly in accordance with claim 1, wherein said cleaning assembly is configured to remove agglomerated particulate matter via an air cleaning.

9. The sampling assembly in accordance with claim 1, wherein said cleaning assembly is configured to remove agglomerated particulate matter via a wet cleaning.

10. A power plant system comprising:
    a boiler configured to generate a flue gas stream; and
    a sampling assembly comprising:
       a vessel configured to receive a portion of the flue gas stream at a predetermined temperature and a reagent product;
       an agitator positioned within said vessel, said agitator configured to rotate within said vessel to cause a chemical reaction to induce formation of particulate matter;
       a sensor coupled to said agitator, said sensor configured to measure a variable operating parameter of said agitator, wherein a change in value of the variable operating parameter is indicative that the particulate matter agglomerates at the predetermined flue gas stream temperature; and
       a fluidizing member.

11. A method of determining an agglomeration limit of particulate matter in a flue gas cleaning system, said method comprising:
  channeling a flue gas stream at a predetermined temperature to a vessel via a sampling filter;
  channeling a reagent product to the vessel to cause a chemical reaction to induce formation of particulate matter; and
  measuring a variable operating parameter of an agitator rotating within the vessel, wherein a change in value of the variable operating parameter is indicative that the particulate matter agglomerates at the predetermined flue gas stream temperature.

12. The method in accordance with claim 11, wherein the sensor is coupled to the agitator and measures a torque of the agitator.

13. The method in accordance with claim 11 further comprising rotating the agitator via a motor, wherein the sensor is coupled to the motor and measures a current of the motor.

14. The method in accordance with claim 11 further comprising extracting the flue gas stream from a flue gas duct via said sampling filter.

15. The method in accordance with claim 11 further comprising extracting heat from the flue gas stream via a heat exchanger.

16. The method in accordance with claim 11 further comprising dispersing the flue gas stream within the vessel via a fluidizing member.

17. The method in accordance with claim 11 further comprising removing agglomerated particulate matter from the vessel and the agitator via a cleaning assembly.

18. The method in accordance with claim 17, wherein agglomerated particulate matter is removed via wet cleaning.

19. The method in accordance with claim 11, wherein said method is a continuous sampling process.

20. The method in accordance with claim 11, wherein said method is a batch sampling process.

* * * * *